Feb. 10, 1925.   1,525,889
L. REYES
FIGURE WHEELED TOY
Filed Jan. 30, 1922   2 Sheets-Sheet 1
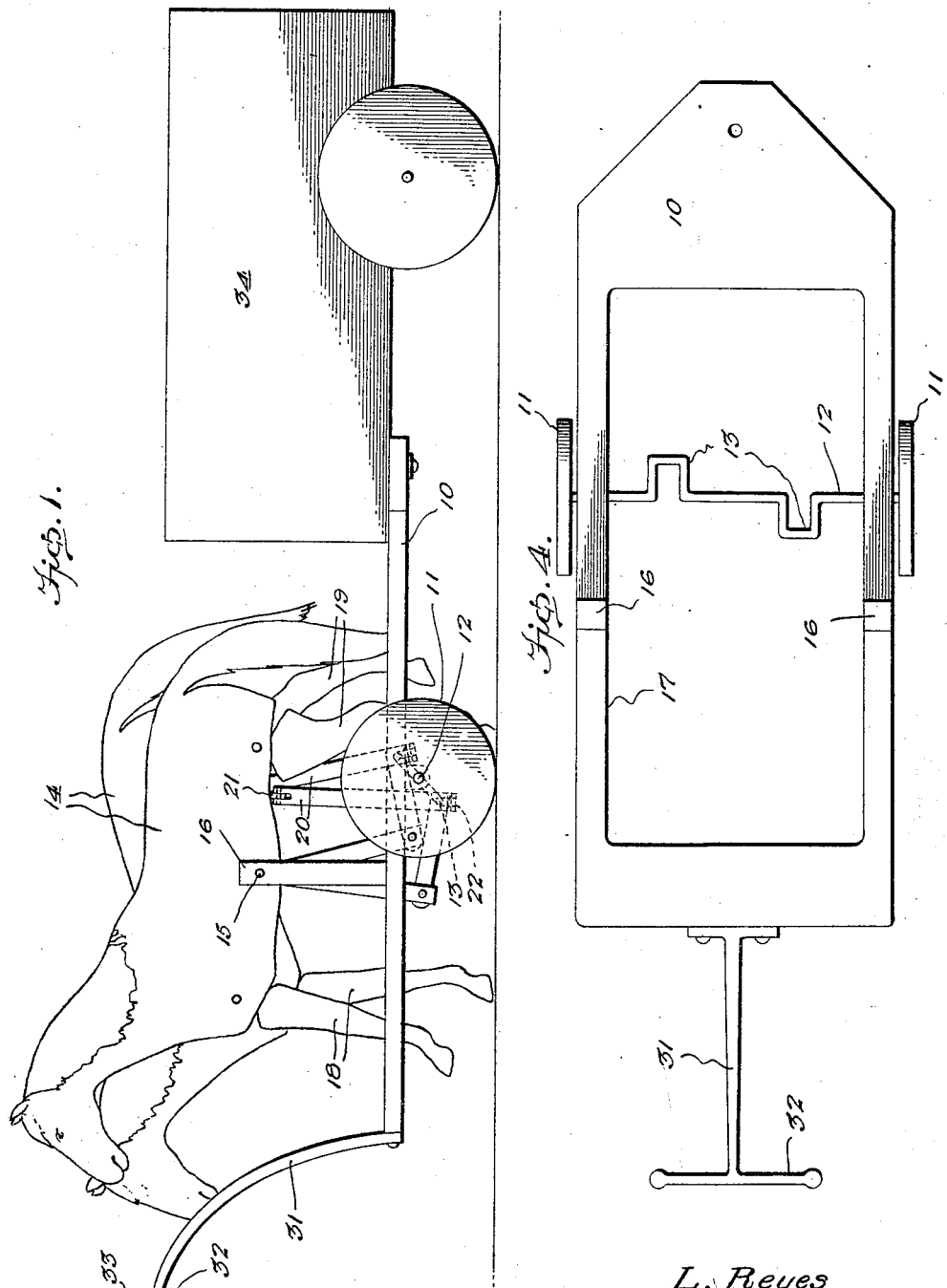
L. Reyes INVENTOR
BY Victor J. Evans ATTORNEY
WITNESS: Paul M. Hunt

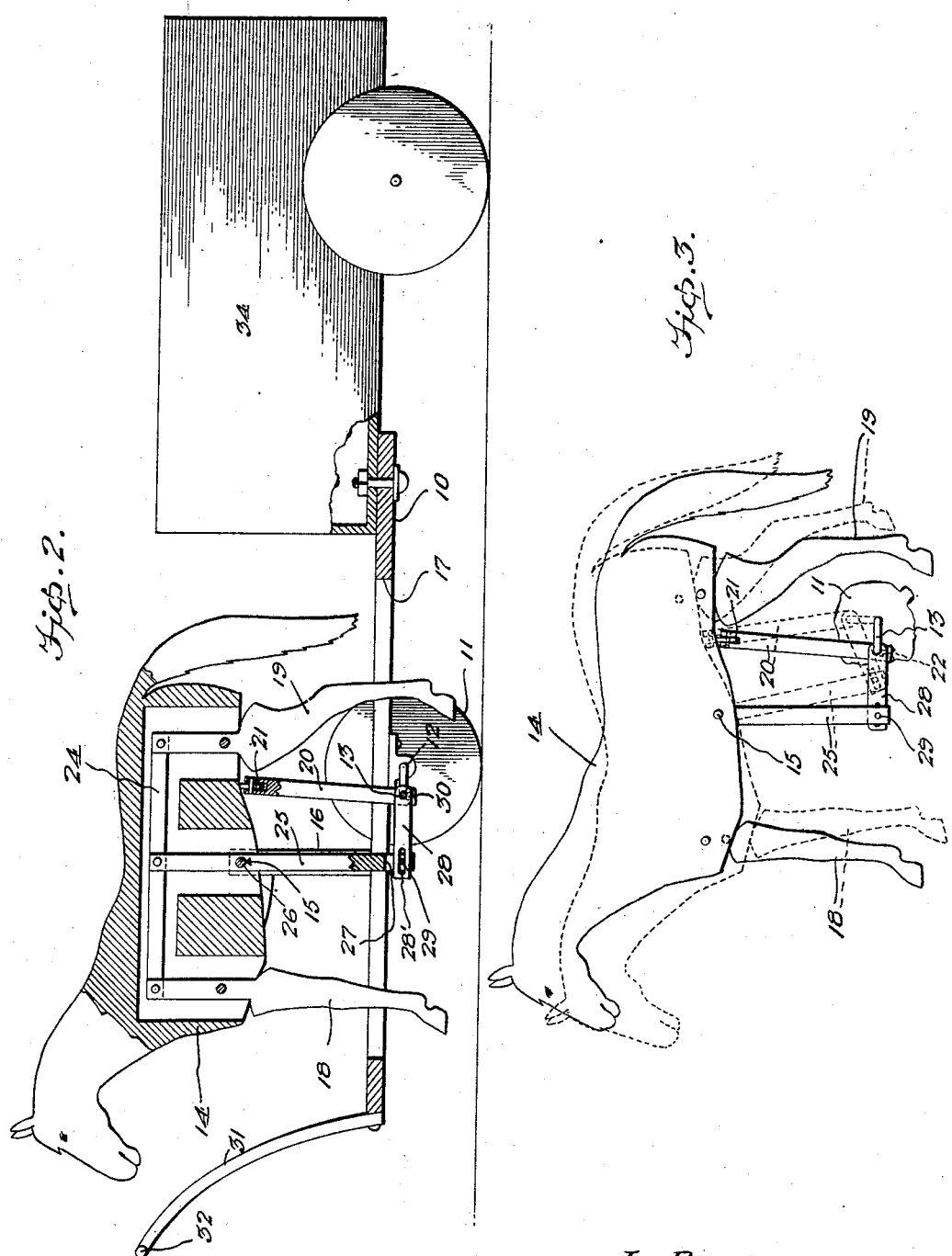

Patented Feb. 10, 1925.

1,525,889

UNITED STATES PATENT OFFICE.

LORENZO REYES, OF BAKERSFIELD, CALIFORNIA.

FIGURE WHEELED TOY.

Application filed January 30, 1922. Serial No. 532,729.

*To all whom it may concern:*

Be it known that I, LORENZO REYES, a citizen of the United States, residing at Bakersfield, in the county of Kern and State of California, have invented new and useful Improvements in Figure Wheeled Toys, of which the following is a specification.

This invention relates to figure toys, and comprehends a toy in the nature of a draft animal or animals which is movably mounted upon a wheeled platform adapted to be drawn over the ground or surface, mechanism being provided to impart an up and down movement to the animals, and also to impart movement to the legs of the animal to afford the appearance of walking when the toy is moved forwardly.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a side elevation of the toy constructed in accordance with the present invention.

Figure 2 is a longitudinal sectional view therethrough.

Figure 3 is a view showing by full and dotted lines the different movements of the animal which occur incident to the forward movement of the toy.

Figure 4 is a plan view of the wheeled platform with the animals removed.

Referring to the drawings in detail, 10 indicates a wheeled platform, the wheels of which being indicated at 11 and connected by an axle 12 having crank portions 13. The animals above referred to are indicated at 14, and they may be of any size or nature without departing from the spirit of the invention. However, in the present embodiment of the invention, the animals represent horses which are pivoted as at 15 on on standards or the like 16, so that an up and down movement may be imparted to the animal when moved forwardly in a manner to be presently described. To allow for this up and down movement, the platform 10 is cut away as at 17, although a portion of the animal extends in advance of the platform 10. In other words, the front legs 18 of the animals are arranged in advance of the platform, while the hind legs 19 operate through the cut away portion 17 of the platform. Depending from the body of each animal is an arm 20 which is pivotally associated with the animal as at 21, while the lower end of the arm is bifurcated as at 22 to straddle one of the crank portions 13 of the axle 12. Manifestly, when the axle is rotated incident to the forward movement of the toy, an up and down movement is imparted to the animals. The front and hind legs of each animal are connected together by a bar 24 which is arranged to slide within the body of the animal longitudinally thereof, while depending from the bar at a point in its length is an extension 25 fulcrumed as at 26. The lower end of this extension is bifurcated as at 27 to receive the adjacent end of a link 28 which connects the extension 26 with the axle 12. The link 28 is slotted as at 28′, and passed through this slot in the bifurcated extremity of the extension 25 is a pin or the like 29 which holds said parts operatively associated. The opposite end of the link is shaped to provide a bearing 30 for the adjacent crank portion 13 of the axle. Obviously, as the toy is moved forwardly over the ground or surface, motion is imparted to the extension 25 through the instrumentality of the link 26 from the axle 12, thereby imparting sliding movement to the bar 24 in a manner to simultaneously oscillate the front and hind legs of the animal to afford the appearance of the animal walking. It is of course understood that this movement of the legs occur simultaneously with the up and down movement of the body of the animal as above described. As shown in Figure 3 the animals move up and down alternately.

Projecting forwardly from the platform is a shaft indicated at 31, and carrying a cross piece 32, to which a string or other flexible element is secured, and by means of which the toy is pulled over the ground or surface. The string is represented at 33. If desired, a small cart 34 may be suitably attached to the rear of the platform 10.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

A toy of the character described comprising a wheeled platform, an axle journaled beneath said platform and including a crank portion, an animal form of body pivoted upon the platform, means connecting the body with said crank portion to impart an up and down movement to said body incident to the rotation of said axle, a bar arranged to slide within said body, front and rear legs depending from said bar, said legs being susceptible of oscillating movement, an extension projecting from said bar, and a connection between the crank portion of said axle and said extension for imparting such movement to said legs incident to the rotation of the axle.

In testimony whereof I affix my signature.

LORENZO REYES.